US007414194B2

(12) United States Patent
Nakayama et al.

(10) Patent No.: US 7,414,194 B2
(45) Date of Patent: Aug. 19, 2008

(54) BUS BAR WIRING BOARD AND METHOD OF ASSEMBLING THE SAME

(75) Inventors: Masashi Nakayama, Haibara-gun (JP); Hiroyuki Nakanishi, Toyota (JP); Keiichi Ito, Toyota (JP); Yoshihiko Nakahama, Toyota (JP)

(73) Assignee: Yazaki Corporation, Tokyo (JP)

( * ) Notice: Subject to any disclaimer, the term of this patent is extended or adjusted under 35 U.S.C. 154(b) by 440 days.

(21) Appl. No.: 10/441,032

(22) Filed: May 20, 2003

(65) Prior Publication Data

US 2004/0109296 A1 Jun. 10, 2004

(30) Foreign Application Priority Data

May 22, 2002 (JP) .......................... P2002-148081

(51) Int. Cl.
*H02G 5/00* (2006.01)

(52) U.S. Cl. .................. 174/68.2; 174/72 B; 174/88 B; 174/99 B; 174/70 B; 439/212; 361/611

(58) Field of Classification Search .................. 174/68, 174/59, 68.2, 65 R, 262, 266, 267, 72 B, 174/71 B, 88 B, 99 B, 70 B, 149 B; 29/837, 29/850; 439/404, 207, 212, 114, 115; 361/794, 361/736, 611, 811
See application file for complete search history.

(56) References Cited

U.S. PATENT DOCUMENTS 3,823,248 A * 7/1974 Christie et al. ............. 174/16.2
4,303,297 A 12/1981 Smart et al.
4,640,137 A * 2/1987 Trull et al. ............. 73/862.046
5,501,605 A * 3/1996 Ozaki et al. .................... 439/34
5,530,625 A * 6/1996 VanDerStuyf et al. ........ 361/794
6,007,374 A * 12/1999 Sukegawa ................ 439/540.1
6,137,054 A * 10/2000 Uezono et al. ................ 174/59
6,283,798 B1 * 9/2001 Takahashi ................... 439/736
6,290,509 B1 * 9/2001 Hattori et al. .............. 439/76.2
6,406,323 B2 * 6/2002 Chung Long Shan ....... 439/395

FOREIGN PATENT DOCUMENTS

JP 08-256420 10/1996
JP 2001177952 A * 6/2001

OTHER PUBLICATIONS

Webster's Oonline Dictionary.*
Dictionary.Com.*
WordReference.Com.*

* cited by examiner

*Primary Examiner*—Dhiru R Patel
(74) *Attorney, Agent, or Firm*—Sughrue Mion, PLLC

(57) ABSTRACT

A bus bar wiring board includes a first conductive bus bar, a second conductive bus bar, a first insulating board, in which one end portions of the first and the second bus bars are embedded and a second insulating board, in which the other end portions of the first and the second bus bars are embedded. A first longitudinal direction of a cross-section of the first bus bar intersects a second longitudinal direction of a cross-section of the second bus bar.

6 Claims, 4 Drawing Sheets

BUS BAR WIRING BOARD AND METHOD OF ASSEMBLING THE SAME

BACKGROUND OF THE INVENTION

This invention relates to a bus bar wiring board used, for example, in the wiring of an electronic equipment.

Various electronic equipments are mounted on a vehicle (mobile body). This kind of electronic equipment includes a casing, a connector, electrical parts such as relays and fuses, and a bus bar wiring board through which metal terminals of the connector are connected to terminals of the relays, fuses and others. The casing is formed into a flattened box-like shape.

The connector includes a box-like connector housing, and the metal terminals received in this connector housing. When the connector is connected to a mating connector, the metal terminals are electrically connected to other electronic equipment or the like. The electrical parts are mounted on the casing and bus bars (described later) of the bus bar wiring board. The bus bar wiring board includes the electrically-conductive bus bars, a first insulating board, and a second insulating board.

Each bus bar is formed by blanking an electrically-conductive metal plate or the like. One end portions of the bus bars are embedded in the first insulating board. The other end portions of the bus bars are embedded in the second insulating board. The electrical parts such as relays are mounted on central portions of the bus bars. Longitudinal directions of cross-sections of the bus bars, each having its opposite end portions embedded respectively in the first and second insulating boards, are parallel to one another.

The mating connector is connected to the connector of the electronic equipment of the above construction, and the metal terminals of the connector are connected to the terminals of the electrical parts through the bus bars. The electronic equipment connects other electronic equipment to the electrical parts in accordance with a predetermined pattern.

In the bus bar wiring board of the related electronic equipment, the longitudinal directions of the cross-sections of the bus bars are parallel to one another. Therefore, the first and second insulating boards are caused to vibrate relative to each other by vibrations developing during the travel of the vehicle. Therefore, the positions of the first and second insulating boards relative to each other change, so that the bus bars are distorted. As a result, there is fears that the electrical connection between the relay and the bus bars is broken and that the bus bars are separated from the first and second insulating boards. Thus, there is a fear that the bus bar wiring board in the related electronic equipment is damaged by vibrations developing during the travel of the automobile.

SUMMARY OF THE INVENTION

It is therefore an object of the present invention to provide a bus bar wiring board and a bus bar wiring board-assembling method, in which the electrical connection between the bus bar wiring board and electrical parts can be prevented from being broken.

In order to achieve the above object, according to the present invention, there is provided a bus bar wiring board, comprising:

a first conductive bus bar;

a second conductive bus bar;

a first insulating board, in which one end portions of the first and the second bus bars are embedded; and a second insulating board, in which the other end portions of the first and the second bus bars are embedded, wherein a first longitudinal direction of a cross-section of the first bus bar intersects a second longitudinal direction of a cross-section of the second bus bar.

In the above configuration, the positions of the first and second insulating boards relative to each other are less liable to change, so that the first and second bus bars are less liable to be distorted. Therefore, the electrical connection between the relay which is mounted on the central portion of the bus bars and the bus bars is prevented from being broken. And besides, the bus bars are prevented from being separated from the first and second insulating boards, so that the bus bar wiring board is prevented from damage.

Preferably, the first longitudinal direction of the first bus bar is perpendicular to the second longitudinal direction of the second bus bar.

In the above configuration, the positions of the first and second insulating boards relative to each other are much less liable to change, so that the bus bars are much less liable to be distorted. Therefore, the electrical connection between the electrical part and the bus bars is positively prevented from being broken. And besides, the bus bar wiring board is positively prevented from damage.

According to the present invention, there is also provided a method of assembling a bus bar wiring board, comprising the steps of:

preparing a first conductive bus bar and a second conductive bus bar;

arranging the first bus bar and the second bus bar so that a first longitudinal direction of a cross-section of the first bus bar and a second longitudinal direction of a cross-section of the second bus bar are parallel each other;

insert-molding a first insulating board so that one end portions of the first and the second bus bars are embedded therein;

insert-molding a second insulating board so that the other end portions of the first and the second bus bars are embedded therein;

bending at least one of the first bus bar and the second bus bar so that a first longitudinal direction of a cross-section of the first bus bar intersects a second longitudinal direction of a cross-sections of the second bus bar.

Preferably, at least one of the first bus bar and the second bus bar is bent so that the first longitudinal direction of the first bus bar perpendicularly intersects the second longitudinal direction of the second bus bar in the bending step.

In the above methods, there can be easily produced the bus bar wiring board in which the positions of the first and second insulating boards relative to each other are less liable to change. Therefore, there can be easily produced the bus bar wiring board in which the electrical connection to the electrical parts is prevented from being broken, and besides this bus bar wiring board is positively prevented from damage.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
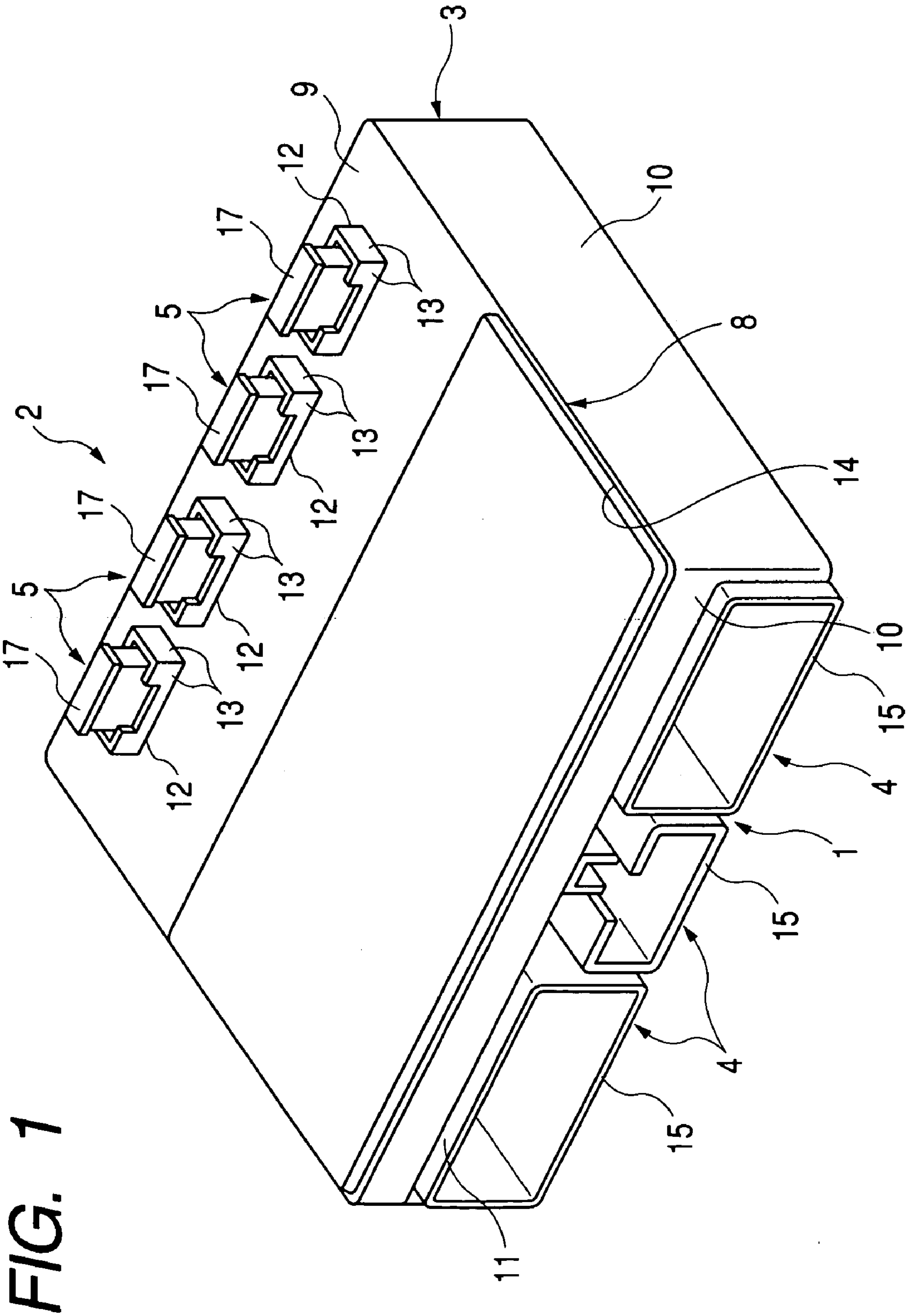
FIG. 1 is a perspective view of an electronic equipment provided with one preferred embodiment of a bus bar wiring board of the invention.

One preferred embodiment of a bus bar wiring board of the present invention will now be described with reference to FIGS. 1 to 5. The bus bar wiring board 1 whose important portion is shown in FIG. 3 on an enlarged scale forms part of an electronic equipment 2 shown in FIGS. 1 and 2. The electronic equipment 2 is mounted on a vehicle or the like. As shown in FIG. 2, the electronic equipment 2 includes a casing 3, a plurality of connectors 4, fuses 5, relays (electrical part) 6, the bus bar wiring board 1, a printed wiring board 7 and a lid 8.

The casing 3 is made of an insulative synthetic resin, and is formed into a flattened box-like shape. The casing 3 includes a substantially flat top wall 9, and a plurality of side walls 10 forming a peripheral wall. The top wall 9 has a rectangular shape when viewed from the top. In the illustrated embodiment, there are provided the four side walls 10. The side walls 10 are continuous with a peripheral edge of the top wall 9. The side walls 10 extend perpendicularly from the peripheral edge of the top wall 9 in the same direction.

Figure 2:
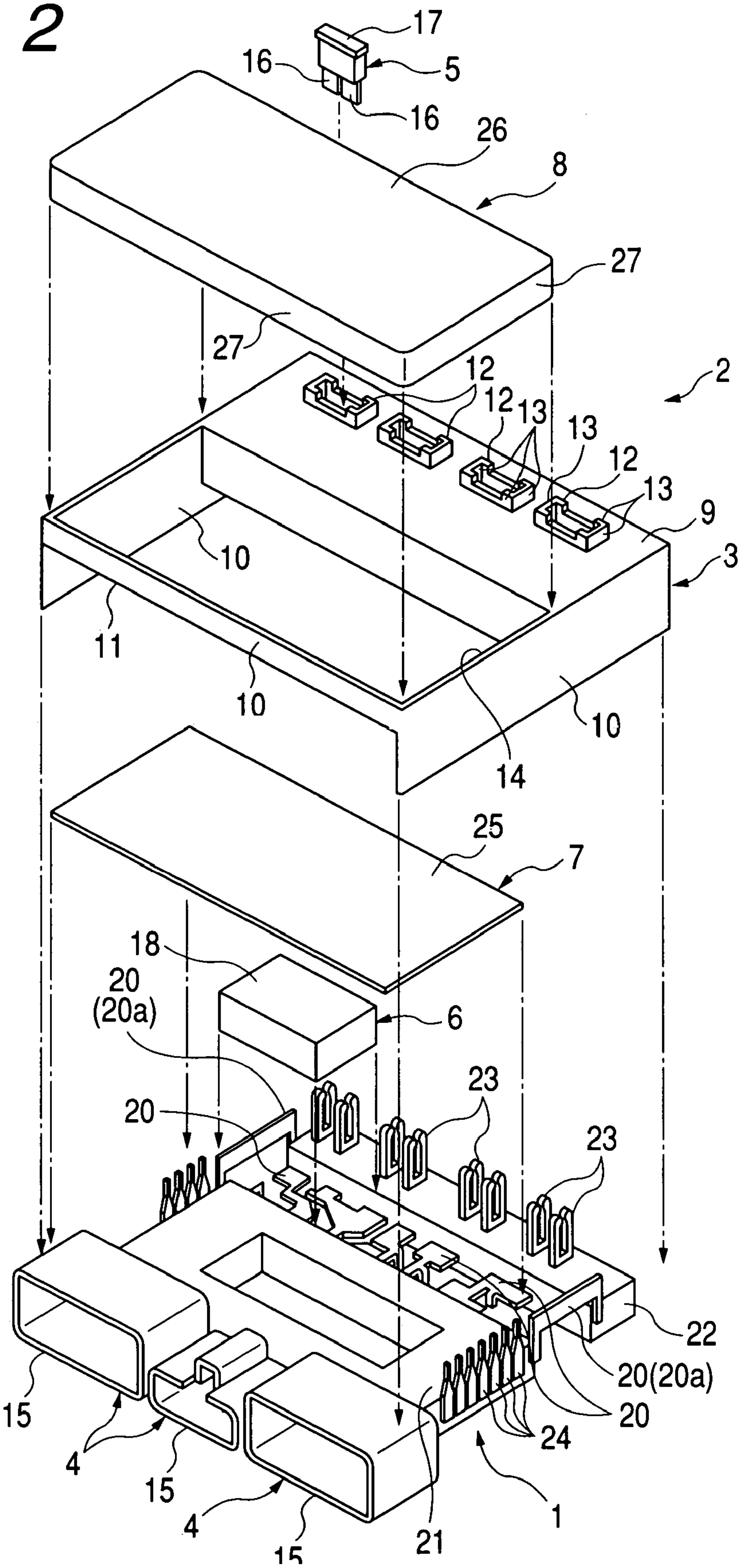
FIG. 2 is an exploded, perspective view of the electronic equipment of FIG. 1.
Figure 3:
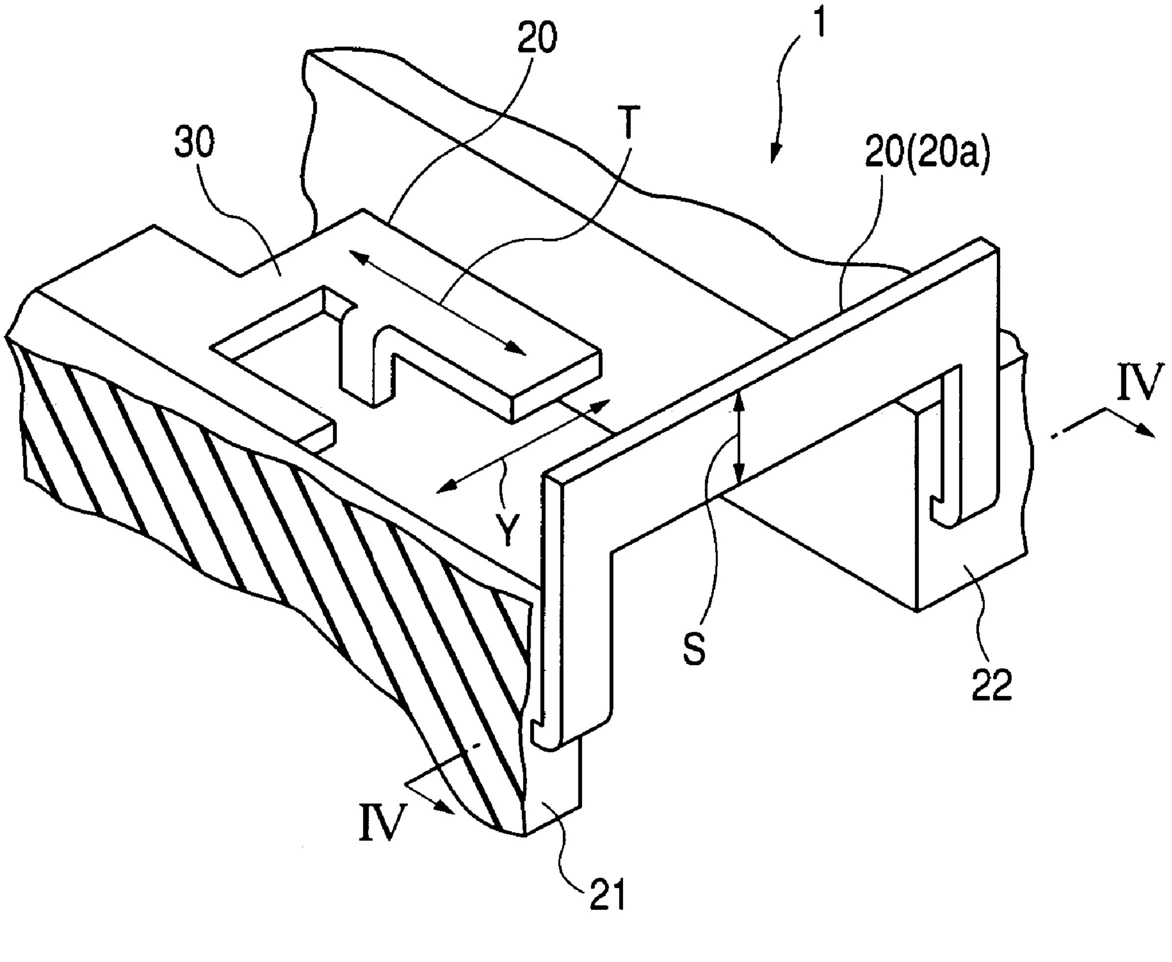
FIG. 3 is a perspective view showing an important portion of the bus bar wiring board of the electronic equipment of FIG. 2 on an enlarged scale.

A notch 11 is formed in the one of the plurality of the side walls 10 which is disposed at the front side in FIGS. 1 and 2. A plurality of fuse mounting portions 12 and an opening 14 are provided at the top wall 9. Each fuse mounting portion 12 includes a rectangular hole extending through the top wall 9, and a plurality of upstanding walls 13 extending upright from a peripheral edge of this hole. Each fuse 5 is mounted in the corresponding fuse mounting portion 12 in such a manner that the fuse 5 is held between the plurality of upstanding walls 13, and extends through the hole. The opening 14 is formed through the top wall 9. The opening 14 has a rectangular shape when viewed from the top, and is provided at one end portion of the top wall 9 disposed adjacent to that side wall 10 having the notch 11.

Each of the connectors 4 includes a connector housing 15 made of a synthetic resin, and metal terminals (not shown) received in this connector housing 15. The connector housing 15 is formed into a tubular shape. The metal terminals are received within the connector housing. Each metal terminal is made of electrically-conductive metal, and is formed into a blade-like shape. The metal terminals are electrically connected to bus bars 20 (describe later) in accordance with a predetermined pattern. When the bus bar wiring board 1 is received in the casing 3, the connectors 4 are exposed to the exterior through the notch 11.

Each of the fuses 5 includes a pair of electrically-conductive terminals 16, a fusible member interconnecting one ends of these terminals 16, and a box-like body 17. The fuses 5 are mounted in the fuse mounting portions 12, respectively. When the fuse 5 is mounted in the fuse mounting portion 12, the pair of terminals 16 are connected respectively to fuse terminals 23 (described later) of the bus bar wiring board 1. When electric current, flowing between the pair of terminals 16, exceeds a predetermined value, the fusible member melts. The one end portions of the terminals 16 and the fusible member are received in the body 17.

The relay 6 includes a box-like body portion 18, and terminals (not shown) extending outwardly from this body portion 18. The relay 6 makes and breaks connections between the terminals in accordance with a predetermined pattern. The relays 6 are mounted on the bus bar wiring board 1 in such a manner that the body portions 18 are superposed on central portions 30 of the bus bars 20 (described later). The terminals of the relays 6 are electrically connected to the bus bars 20.

Figure 4:
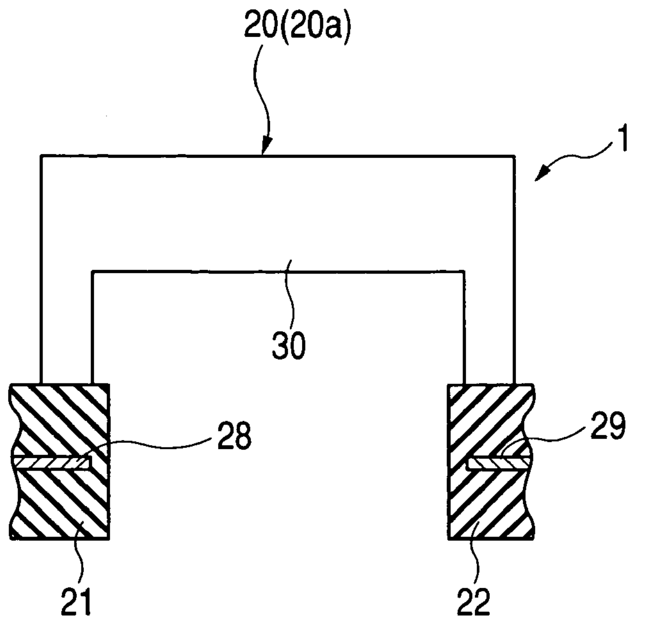
FIG. 4 is a cross-sectional view taken along the line IV-IV of FIG. 3.

As shown in FIG. 2, the bus bar wiring board 1 includes the plurality of bus bars 20, a first insulating board 21, a second insulating board 22, the plurality of fuse terminals 23, and a plurality of board terminals 24. Each bus bar 20 is made of an electrically-conductive metal plate, and is formed into a strip-like shape. As shown in FIG. 4, one end portion 28 of each bus bar 20 is embedded in the first insulating board 21 while the other end portion 29 thereof is embedded in the second insulating board 22. The bus bars 20 are provided between the first insulating board 21 and the second insulating board 22.

The cross-section of the bus bars 20, intersecting the longitudinal direction, has a rectangular shape. Two bus bars 20 (hereinafter designated by reference numeral 20*a*) among the plurality of bus bars 20 project from side edges of the first and second insulating boards 21 and 22. The two bus bars 20*a* correspond to "at least one bus bar" recited in this specification. The other bus bars 20 are provided between those edges of the first and second insulating boards 21 and 22 facing each other. The longitudinal directions (indicated by arrow T in FIG. 3) of the cross-sections of the other bus bars 20 are extend along the surfaces of the first and second insulating boards 21 and 22, and are parallel to one another.

The longitudinal directions (indicated by arrow S in FIG. 3) of the cross-sections of the two bus bars 20*a*, projecting from the side edges of the first and second insulating boards 21 and 22, intersect the longitudinal directions T of the cross-sections of the other bus bars 20. In this embodiment, the longitudinal directions S of the cross-sections of the two bus bars 20*a* perpendicularly intersect the longitudinal directions T of the cross-sections of the other bus bars 20. The bus bars 20 of the above construction are electrically connected to the metal terminals within the connector housing 15, the fuse terminals 23 and the board terminals 24 in accordance with the predetermined pattern. Thus, the bus bars 20 electrically connect mating connectors which are connected respectively to the connectors 4, the electrical parts (such as the fuses 5 and the relays 6), various electronic parts on the printed wiring board 7 together in accordance with a predetermined pattern. "The cross-section of the bus bar 20, 20*a*", described in this specification, is the cross-section of the bus bar 20, 20*a* disposed perpendicular to (intersecting) the direction (indicated by arrow Y in FIG. 3) of opposing of the opposed edges of the first and second insulating boards 21 and 22 to each other.

The first insulating board 21 is made of an insulative synthetic resin, and is formed into a flat plate-like shape. The one end portions 28 of the bus bars 20 are embedded in the first insulating board 21, and this first insulating board 21 is fixed to the connector housings 15 of the connectors 14. The second insulating board 22 is made of an insulative synthetic resin, and is formed into a flat plate-like shape. The other end portions 29 of the bus bars 20 are embedded in the second insulating board 22. The surface of the first insulating board 21 is parallel to the surface of the second insulating board 22. The first insulating board 21 and the second insulating board 22 are arranged in such a manner that they are spaced from each other. Those edges of the first and second insulating boards 21 and 22, opposed to each other, are parallel to each other.

The plurality of fuse terminals 23 extend upright from the second insulating board 22. When the bus bar wiring board 1 is received within the casing 3, the fuse terminals 23, projecting from the second insulating board 22, extend into the fuse mounting portions 12 provided at the top wall 9 of the casing 3. The terminals 16 of the fuses 5 are connected to the fuse terminals 23, respectively.

The board terminals 24 extend upright from the first insulating board 21. When the bus bar wiring board 1 is received within the casing 3, the board terminals 24, projecting from the first insulating board 21, extend toward the top wall 9 of the casing 3. A conductive pattern (not shown) on the printed wiring board 7 is connected to the board terminals 24. The bus bar wiring board 1 is received within the casing 3 in such a manner that the first and second insulating boards 21 and 22 are disposed in parallel, spaced relation to the top wall 9.

The printed wiring board 7 is mounted on the board terminals 24 in such a manner that this board 7 is disposed between the first insulating board 21 and the top wall 9. The printed wiring board 7 is disposed parallel to both of the first insulating board 21 and the top wall 9. The printed wiring board 7 includes an insulative board 25, the plurality of electronic parts, and the conductive pattern formed on the surface of the board 25. The electronic parts are mounted on the surface of the board 25. The conductive pattern is made of electrically-conductive metal such as copper, and is in the form of a foil, and is affixed to the surface of the board 25. The conductive pattern electrically connects the electronic parts to the board terminals 24 in accordance with a predetermined pattern.

The lid 8 includes a flat top wall 26, and a plurality of side walls 27 (forming a peripheral wall) extending perpendicularly from a peripheral edge of this top wall 26. The top wall 26 has a rectangular shape when viewed from the top. The side walls 27 extend perpendicularly from the peripheral edge of the top wall 26 in the same direction. The lid 8 is attached to the casing 3 in such a manner that the top wall 26 closes the opening 14, with the side walls 27 received in the opening 14. The lid 8 is fixedly secured to the first insulating board 21 of the bus bar wiring board 1 by screws (not shown) or the like.

When the lid 8 is fixedly secured to the first insulating board 21 by the screws, the lid 8 and the first insulating board 21 of the bus bar wiring board 1 hold the casing 3 therebetween to fix the same. Namely, when the lid 8 is fixedly secured to the first insulating board 21 by the screws, the bus bar wiring board 1, the casing 3 and the lid 8 are fixed to one another.

For assembling the electronic equipment 2 of the above construction, first, the bus bar wiring board 1, the casing 3, the connectors 4, the relays 6, the fuses 5, the printed wiring board 7, the lid 8 and so on are produced. For assembling the bus bar wiring board 1, first, the bus bars 20 of desired shapes are produced by blanking an electrically-conductive metal plate. These bus bars 20 are arranged in such a manner that the longitudinal directions of the cross-sections thereof are parallel to one another, and thereafter the first insulating board 21 is molded by insert molding in such a manner that the one end portions 28 of the bus bars 20 are embedded therein, and the second insulating board 22 is molded by insert molding in such a manner that the other end portions 29 of the bus bars 20 are embedded therein.

Figure 5:
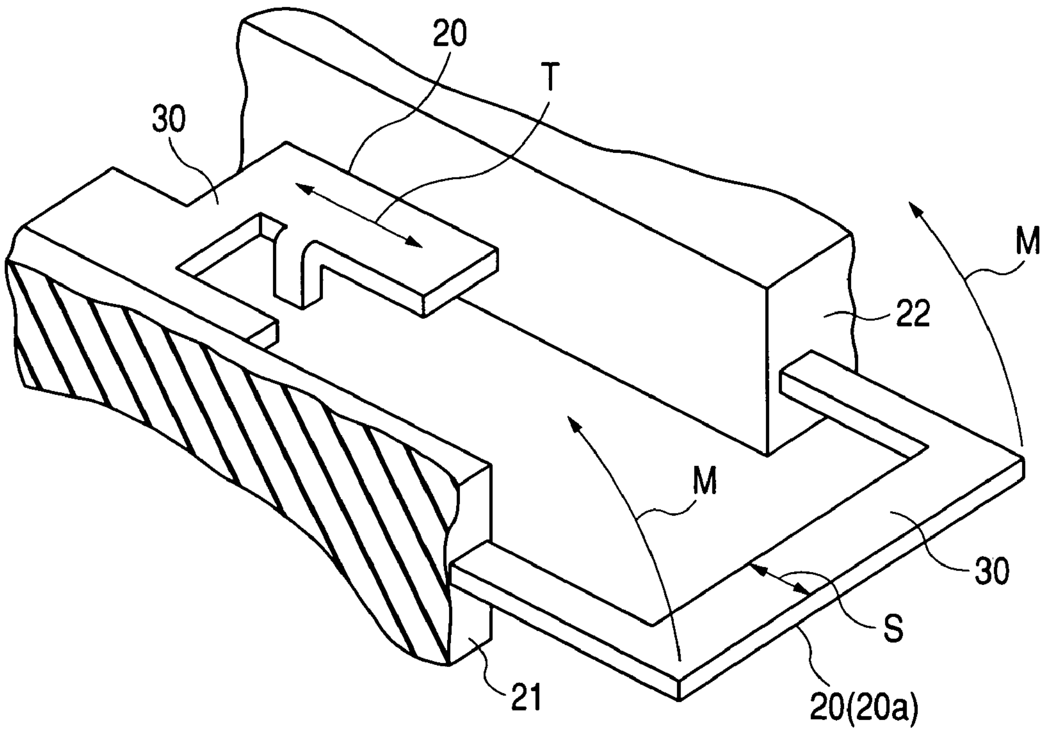
FIG. 5 is a perspective view showing an important portion of an intermediate product of the bus bar wiring board of FIG. 3 during an assembling operation on an enlarged scale.

The board terminals 24 are also embedded in the first insulating board 21 simultaneously when molding the first insulating board 21. The fuse terminals 23 are also embedded in the second insulating board 22 simultaneously when molding the second insulating board 22. At this time, the longitudinal directions S of the cross-sections of the two bus bars 20*a*, projecting from the side edges of the first and second insulating boards 21 and 22, are parallel to the longitudinal directions T of the cross-sections of the other bus bars 20 as shown in FIG. 5. Then, each of the bus bars 20*a* is bent in a direction of arrow M (in FIG. 5) until the longitudinal directions S become perpendicular to (or intersect) the longitudinal directions T. In this manner, the bus bar wiring board 1 is assembled.

Thereafter, the connectors 4 are mounted on the first insulating board 21, and the printed wiring board 7 is mounted on the board terminals 24. Further, the relays 6 are mounted on the central portions 30 (shown in FIG. 3) of the bus bars 20. The bus bar wiring board 1, having the connectors 4, the printed wiring board 7 and the relays 6, is received within the casing 3. The connectors 4 are exposed to the exterior through the notch 11. The lid 8 is inserted into the opening 14, and the lid 8 is fixedly secured to the bus bar wiring board 1 by the screws. Further, the fuses 5 are mounted in the fuse mounting portions 12, respectively, thus assembling the electronic equipment 2 of the above construction.

In this embodiment, the longitudinal directions S of the cross-sections of the two bus bars 20*a* intersect (perpendicularly intersect) the longitudinal directions T of the cross-sections of the other bus bars 20. Therefore, the positions of the first and second insulating boards 21 and 22 relative to each other are less liable to change, so that the bus bars 20 are less liable to be distorted. Therefore, the electrical connection between the relay 6, mounted on the central portion of the bus bar 20, and the bus bar 20 is prevented from being broken. And besides, the bus bars 20 are prevented from being separated from the first and second insulating boards 21 and 22, so that the bus bar wiring board 1 is prevented from damage.

After the opposite end portions 28 and 29 of each of the bus bars 20 are embedded respectively in the first and second insulating boards 21 and 22, the two bus bars 20*a* are bent until the longitudinal directions S becomes perpendicular to (or intersect) the longitudinal directions T. Therefore, there can be easily produced the bus bar wiring board 1 in which the positions of the first and second insulating boards 21 and 22 relative to each other are less liable to change. Therefore, there can be easily produced the bus bar wiring board 1 in which the electrical connection to the relays 6 is prevented from being broken, and besides this bus bar wiring board is positively prevented from damage.

In the above embodiment, the longitudinal directions S of the cross-sections of the two bus bars 20*a* perpendicularly intersect the longitudinal directions T of the cross-sections of the other bus bars 20. In this invention, however, the longitudinal direction of the cross-section of one bus bar may perpendicularly intersect the longitudinal directions T of the cross-sections of the other bus bars 20, or the longitudinal directions of the cross-sections of three or more bus bars may perpendicularly intersect the longitudinal directions T of the cross-sections of the other bus bars 20.

What is claimed is:

1. A bus bar wiring board, comprising:

a first conductive bus bar;

a second conductive bus bar;

a first insulating board, in which one end portions of the first and the second bus bars are embedded within a body of the first insulating board; and a second insulating board, in which the other end portions of the first and the second bus bars are embedded within a body of the second insulating board, wherein a first longitudinal direction of a cross-section of the first bus bar at a location between the first and second insulating boards intersects a second longitudinal direction of a cross-section of the second bus bar at a location between the first and second insulating boards.

2. The bus bar wiring board as set forth in claim 1, wherein the first longitudinal direction of the first bus bar is perpendicular to the second longitudinal direction of the second bus bar.

3. The bus bar wire board as set forth in claim 1, wherein the first and second conductive bus bars are not connected to each other.

4. A method of assembling a bus bar wiring board, comprising the steps of:

preparing a first conductive bus bar and a second conductive bus bar;

arranging the first bus bar and the second bus bar so that a first longitudinal direction of a cross-section of the first bus bar and a second longitudinal direction of a cross-section of the second bus bar are parallel each other;

insert-molding a first insulating board so that one end portions of the first and the second bus bars are embedded within a body of the first insulating board;

insert-molding a second insulating board so that the other end portions of the first and the second bus bars are embedded within a body of the second insulating board;

bending at least one of the first bus bar and the second bus bar so that a first longitudinal direction of the cross-section of the first bus bar intersects the second longitudinal direction of a cross-section of the second bus bar at a location between the first and second insulating boards.

5. The method as set forth in claim 4, wherein at least one of the first bus bar and the second bus bar is bent so that the first longitudinal direction of the first bus bar perpendicularly intersects the second longitudinal direction of the second bus bar in the bending step.

6. The method as set forth in claim 4, wherein the first and second conductive bus bars are not connected to each other.

* * * * *